(12) United States Patent
Lee

(10) Patent No.: US 12,088,916 B2
(45) Date of Patent: Sep. 10, 2024

(54) METHOD AND APPARATUS FOR GENERATING BLUR KERNEL OF INFRARED IMAGE

(71) Applicant: AGENCY FOR DEFENSE DEVELOPMENT, Daejeon (KR)

(72) Inventor: Kang Il Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/508,162

(22) Filed: Nov. 13, 2023

(65) Prior Publication Data

US 2024/0236489 A1   Jul. 11, 2024

(30) Foreign Application Priority Data

Jan. 5, 2023   (KR) .................. 10-2023-0001944

(51) Int. Cl.
*G06K 9/00*    (2022.01)
*G06F 17/11*   (2006.01)
*G06T 5/73*    (2024.01)
*H04N 23/23*   (2023.01)
*H04N 23/68*   (2023.01)
*G06T 7/70*    (2017.01)

(52) U.S. Cl.
CPC ......... *H04N 23/683* (2023.01); *G06F 17/11* (2013.01); *G06T 5/73* (2024.01); *H04N 23/23* (2023.01); *G06T 7/70* (2017.01); *G06T 2207/10048* (2013.01); *G06T 2207/20201* (2013.01)

(58) Field of Classification Search
CPC ...................................... G06T 5/73
See application file for complete search history.

(56) References Cited

U.S. PATENT DOCUMENTS 10,147,216 B1 *  12/2018 Miao .................. G06T 5/50
11,270,260 B2 *   3/2022 Fisher ................. G01S 3/00
11,548,407 B2 *   1/2023 Villanueva ........ H01M 10/6568
(Continued)

FOREIGN PATENT DOCUMENTS

KR   101181161   9/2012
KR   101348681   1/2014
(Continued)

OTHER PUBLICATIONS

"Office Action of Korea Counterpart Application", issued on Mar. 27, 2023, with English translation thereof, p. 1-p. 8.
(Continued)

*Primary Examiner* — Hadi Akhavannik
(74) *Attorney, Agent, or Firm* — JCIPRNET

(57) ABSTRACT

The disclosure relates to a technique for generating a temperature blur kernel by using a heat balance equation. A method of generating a temperature blur kernel includes obtaining first performance information corresponding to an infrared (IR) sensor and second performance information corresponding to a gyro sensor, obtaining an output image equation based on a heat balance equation, the first performance information, and the second performance information, and generating a temperature blur kernel based on the output image equation, the first performance information, and the second performance information.

7 Claims, 12 Drawing Sheets

(56) References Cited

U.S. PATENT DOCUMENTS

| | | | |
|---|---|---|---|
| 2013/0128123 A1* | 5/2013 | Rifkah | G06T 5/70 |
| | | | 348/607 |
| 2017/0104933 A1 | 4/2017 | Paik et al. | |
| 2017/0155887 A1* | 6/2017 | Zhou | G06V 20/64 |
| 2017/0295325 A1* | 10/2017 | Yoon | H04N 23/6811 |
| 2018/0061018 A1 | 3/2018 | Ahn et al. | |
| 2018/0160094 A1* | 6/2018 | Shintani | H04N 13/128 |
| 2020/0250804 A1* | 8/2020 | Hu | G06T 5/50 |
| 2020/0265567 A1* | 8/2020 | Hu | G06T 5/50 |
| 2020/0348436 A1* | 11/2020 | Onlek | G01V 3/15 |
| 2021/0074036 A1* | 3/2021 | Fuchs | G06T 11/006 |
| 2021/0223037 A1* | 7/2021 | Sohn | G06T 7/0004 |
| 2021/0281813 A1* | 9/2021 | Vyas | G06T 3/4053 |
| 2022/0122223 A1* | 4/2022 | Choi | G06T 5/70 |
| 2022/0293078 A1* | 9/2022 | Hoffberg | H04K 3/00 |
| 2023/0025022 A1* | 1/2023 | Jung | G06N 3/0464 |

FOREIGN PATENT DOCUMENTS

| | | |
|---|---|---|
| KR | 101596203 | 2/2016 |
| KR | 101801749 | 11/2017 |
| KR | 1020210074010 | 6/2021 |

OTHER PUBLICATIONS

"Office Action of Korea Counterpart Application", issued on Jul. 2, 2023, with English translation thereof, p. 1-p. 9.

Kangil Lee et al., "Motion Blur Kernel Rendering Using an Inertial Sensor: Interpreting the Mechanism of a Thermal Detector," Sensors, Feb. 2022, pp. 1-26.

* cited by examiner

| SBTI Dataset | SRN [33] | | SIUN [36] | | DeblurGAN.v2 [35] | | CDVD [34] | | Ours | |
|---|---|---|---|---|---|---|---|---|---|---|
| | PSNR | SSIM | PSNR | SSIM | PSNR | SSIM | PSNR | SSIM | PSNR | SSIM |
| [1-1] | 40.33 | 0.9881 | 41.03 | 0.9914 | 41.30 | 0.9910 | 39.62 | 0.9905 | 41.57 | 0.9926 |
| [1-2] | 37.96 | 0.9849 | 38.45 | 0.9889 | 38.37 | 0.9872 | 37.09 | 0.9874 | 38.79 | 0.9906 |
| [1-3] | 35.94 | 0.9815 | 36.45 | 0.9858 | 36.13 | 0.9835 | 35.05 | 0.9840 | 36.42 | 0.9880 |
| [1-4] | 30.97 | 0.9675 | 31.11 | 0.9714 | 30.91 | 0.9695 | 30.36 | 0.9699 | 31.06 | 0.9756 |
| [1-5] | 26.69 | 0.9419 | 26.74 | 0.9476 | 26.64 | 0.9456 | 26.32 | 0.9453 | 26.65 | 0.9526 |
| [1-6] | 24.59 | 0.9221 | 24.67 | 0.9298 | 24.57 | 0.9273 | 24.34 | 0.9271 | 24.52 | 0.9337 |
| [1-7] | 23.21 | 0.9049 | 23.33 | 0.9141 | 23.22 | 0.9118 | 23.07 | 0.9130 | 23.11 | 0.9165 |
| Average | 31.38 | 0.9558 | 31.67 | 0.9613 | 31.59 | 0.9594 | 30.84 | 0.9596 | 31.73 | 0.9642 |

FIG. 7B

| SBTI Dataset | SRN [33] | | SIUN [36] | | DeblurGAN.v2 [35] | | CDVD [34] | | Ours | |
|---|---|---|---|---|---|---|---|---|---|---|
| | PSNR | SSIM | PSNR | SSIM | PSNR | SSIM | PSNR | SSIM | PSNR | SSIM |
| [2-1] | 28.66 | 0.8573 | 29.74 | 0.9026 | 32.25 | 0.9458 | 28.12 | 0.8358 | 32.98 | 0.9600 |
| [2-2] | 27.06 | 0.8247 | 27.97 | 0.8719 | 30.06 | 0.9221 | 26.54 | 0.8076 | 30.93 | 0.9504 |
| [2-3] | 26.02 | 0.8048 | 26.72 | 0.8455 | 28.69 | 0.9014 | 25.57 | 0.7891 | 29.55 | 0.9396 |
| [2-4] | 23.82 | 0.7603 | 24.32 | 0.7805 | 25.81 | 0.8405 | 24.04 | 0.7679 | 26.38 | 0.9034 |
| [2-5] | 21.78 | 0.7128 | 22.54 | 0.7421 | 23.36 | 0.7738 | 22.74 | 0.7674 | 23.49 | 0.8492 |
| [2-6] | 20.29 | 0.6743 | 21.01 | 0.7063 | 21.74 | 0.7262 | 21.53 | 0.7450 | 21.86 | 0.8104 |
| [2-7] | 19.11 | 0.6487 | 19.66 | 0.6776 | 20.28 | 0.6902 | 20.47 | 0.7204 | 20.61 | 0.7757 |
| Average | 23.82 | 0.7547 | 24.56 | 0.7895 | 26.03 | 0.8286 | 24.14 | 0.7762 | 26.54 | 0.8841 |

FIG. 7C

| SBTI Dataset | SRN [33] | | SIUN [36] | | DeblurGAN.v2 [35] | | CDVD [34] | | Ours | |
|---|---|---|---|---|---|---|---|---|---|---|
| | PSNR | SSIM | PSNR | SSIM | PSNR | SSIM | PSNR | SSIM | PSNR | SSIM |
| [3-1] | 29.20 | 0.8606 | 29.64 | 0.8862 | 35.69 | 0.9603 | 34.034 | 0.9240 | 36.556 | 0.9600 |
| [3-2] | 27.93 | 0.8305 | 28.66 | 0.8597 | 33.79 | 0.9368 | 32.43 | 0.9081 | 35.02 | 0.9525 |
| [3-3] | 27.05 | 0.8053 | 27.92 | 0.8394 | 32.66 | 0.9201 | 31.45 | 0.8965 | 33.95 | 0.9452 |
| [3-4] | 25.34 | 0.7556 | 26.25 | 0.7961 | 30.10 | 0.8772 | 29.21 | 0.8657 | 31.10 | 0.9177 |
| [3-5] | 24.29 | 0.7348 | 24.90 | 0.7656 | 27.27 | 0.8237 | 26.72 | 0.8263 | 28.00 | 0.8786 |
| [3-6] | 23.38 | 0.7196 | 23.90 | 0.7435 | 25.52 | 0.7882 | 25.4 | 0.7982 | 25.93 | 0.8427 |
| [3-7] | 22.48 | 0.7034 | 22.94 | 0.7215 | 24.21 | 0.7605 | 23.82 | 0.7726 | 24.53 | 0.8128 |
| Average | 25.67 | 0.7728 | 26.32 | 0.8017 | 29.89 | 0.8667 | 28.97 | 0.8559 | 30.73 | 0.9013 |

FIG. 7D

| SBTI Dataset | SRN [33] PSNR | SRN [33] SSIM | SIUN [36] PSNR | SIUN [36] SSIM | DeblurGAN.v2 [35] PSNR | DeblurGAN.v2 [35] SSIM | CDVD [34] PSNR | CDVD [34] SSIM | Ours PSNR | Ours SSIM |
|---|---|---|---|---|---|---|---|---|---|---|
| [4-1] | 30.37 | 0.8925 | 31.42 | 0.9271 | 33.63 | 0.9552 | 32.19 | 0.9258 | 34.05 | 0.9640 |
| [4-2] | 29.02 | 0.8742 | 29.78 | 0.9066 | 31.78 | 0.9373 | 30.77 | 0.9177 | 32.34 | 0.8589 |
| [4-3] | 28.14 | 0.8620 | 28.71 | 0.8900 | 30.67 | 0.9262 | 29.86 | 0.9110 | 31.22 | 0.9532 |
| [4-4] | 25.98 | 0.8294 | 26.40 | 0.8531 | 27.87 | 0.8923 | 27.44 | 0.8937 | 28.20 | 0.9312 |
| [4-5] | 23.88 | 0.7947 | 24.22 | 0.8137 | 25.19 | 0.8506 | 24.81 | 0.8636 | 25.02 | 0.8956 |
| [4-6] | 22.53 | 0.7731 | 22.82 | 0.7869 | 23.53 | 0.7216 | 23.22 | 0.7390 | 23.41 | 0.8704 |
| [4-7] | 21.52 | 0.7567 | 21.74 | 0.7662 | 22.33 | 0.8022 | 22.06 | 0.8175 | 22.30 | 0.8460 |
| Average | 25.92 | 0.8261 | 26.44 | 0.8491 | 27.86 | 0.8836 | 27.19 | 0.8812 | 28.08 | 0.9170 |

METHOD AND APPARATUS FOR GENERATING BLUR KERNEL OF INFRARED IMAGE

CROSS-REFERENCE TO RELATED APPLICATIONS

This application is based on and claims priority under 35 U.S.C. § 119 to Korean Patent Application No. 10-2023-0001944, filed on Jan. 5, 2023, in the Korean Intellectual Property Office, the disclosure of which is incorporated by reference herein in its entirety.

BACKGROUND

1. Field

The disclosure relates to a technique for generating a temperature blur kernel by using a heat balance equation.

2. Description of the Related Art

Infrared images have been actively used in civilian sectors as well as military purposes. Recently, the usability of the infrared images has increased, such as use in drones and autonomous driving vehicles, etc. Moreover, due to the recent influence of COVID-19, research on, for example, technology for effectively measuring a human body temperature, etc., has been actively conducted.

General image processing methods, such as denoising, contrast enhancement, deblocking, inpainting, deblurring, compressive sensing recovery, etc., have been studied for visible light band images. However, due to domain dependence, many image processing algorithms proposed based on visible light images may not guarantee performance thereof in infrared images. That is, algorithms based on visible light images may undergo performance degradation in infrared images, and thus development of algorithms suitable for an image domain is required.

Such image domain dependence may also exist in an image deblurring region.

The above-described background technology is technical information that the inventor holds for deriving the disclosure or is acquired in a derivation process of the disclosure, and is not necessarily a technology disclosed to the general public prior to filing of the present application.

SUMMARY

Provided is a method and apparatus for generating a temperature blur kernel.

Additional aspects will be set forth in part in the description which follows and, in part, will be apparent from the description, or may be learned by practice of the presented embodiments.

According to an aspect of the disclosure, a method of generating a temperature blur kernel includes obtaining first performance information corresponding to an infrared (IR) sensor and second performance information corresponding to a gyro sensor, obtaining an output image equation based on a heat balance equation, the first performance information, and the second performance information, and generating a temperature blur kernel based on the output image equation, the first performance information, and the second performance information.

The first performance information may include a time interval between frames, a focal length, and an angle of view of one pixel, and the second performance information may include a measurable maximum angular velocity and a number of data pieces obtained for a unit time.

The output image equation may be expressed as Equation 3 provided below.

$$B_{x,y}(t_k) = \alpha \sum_{n=1}^{k}(1-\alpha)^{k-n} S_{x,y}(t_n) (x, y \text{ is the position of pixel}) \quad [\text{Equation 1}]$$

$$\alpha = \frac{h}{\tau + h}$$

$B_{x,y}(t_k)$ indicates a final output image at a time $t_k$, $S_{x,y}(t_n)$ indicates a non-blurring image at a time $t_n$, $\tau$ indicates a thermal time constant, and h indicates a time interval between frames.

The time interval between the frames may satisfy Equation 2.

$$h \leq \frac{IFOV}{\omega} \quad [\text{Equation 2}]$$

wherein h indicates a time interval between frames, IFOV indicates an angle of view of one pixel, and $\omega$ indicates a measurable maximum angular velocity.

The temperature blur kernel may be calculated by Equation 3.

$$k_t[x, y] = \frac{\alpha}{\left(1-(1-\alpha)^{N_t}\right)} \sum_{i=1}^{N_t}(1-\alpha)^{N_t-i} \delta[x-x_i, y-y_i] \quad [\text{Equation 3}]$$

$$(x_i, y_i, 1) = H(\theta(t_i))(x_0, y_0, 1), \alpha = \frac{h}{\tau + h}$$

$(x, y \text{ is the position of pixel})$ wherein $k_t[x, y]$ indicates a temperature blur kernel, $N_t$ indicates a number of data pieces of the gyro sensor, obtained for a time $m\tau$, $H(\theta(t_i))$ indicates a homography transform function, $\theta(t_i)$ indicates a rotational angle in $t_i$, m indicates a user count, $\tau$ indicates a thermal time constant, and h indicates a time interval between frames.

According to another aspect of the disclosure, a method of correcting an image includes obtaining an infrared (IR) image by using an IR sensor, obtaining a camera angle information by using a gyro sensor, and generating a deblurring image through the IR image and the camera angle information by using a temperature blur kernel based on a heat balance equation.

According to another aspect of the disclosure, an infrared (IR) camera includes an IR sensor configured to sense IR energy and convert the IR energy into an IR image, a gyro sensor configured to measure angle information of an IR camera, and a processor configured to generate a deblurring image through the IR image and the angle information of the IR camera by using a temperature blur kernel based on a heat balance equation.

BRIEF DESCRIPTION OF THE DRAWINGS

The above and other aspects, features, and advantages of certain embodiments will be more apparent from the following description taken in conjunction with the accompanying drawings, in which:

FIGS. 7A to 7D show tables for comparing performance of temperature blur kernels according to an embodiment.

DETAILED DESCRIPTION

Figure 1A:
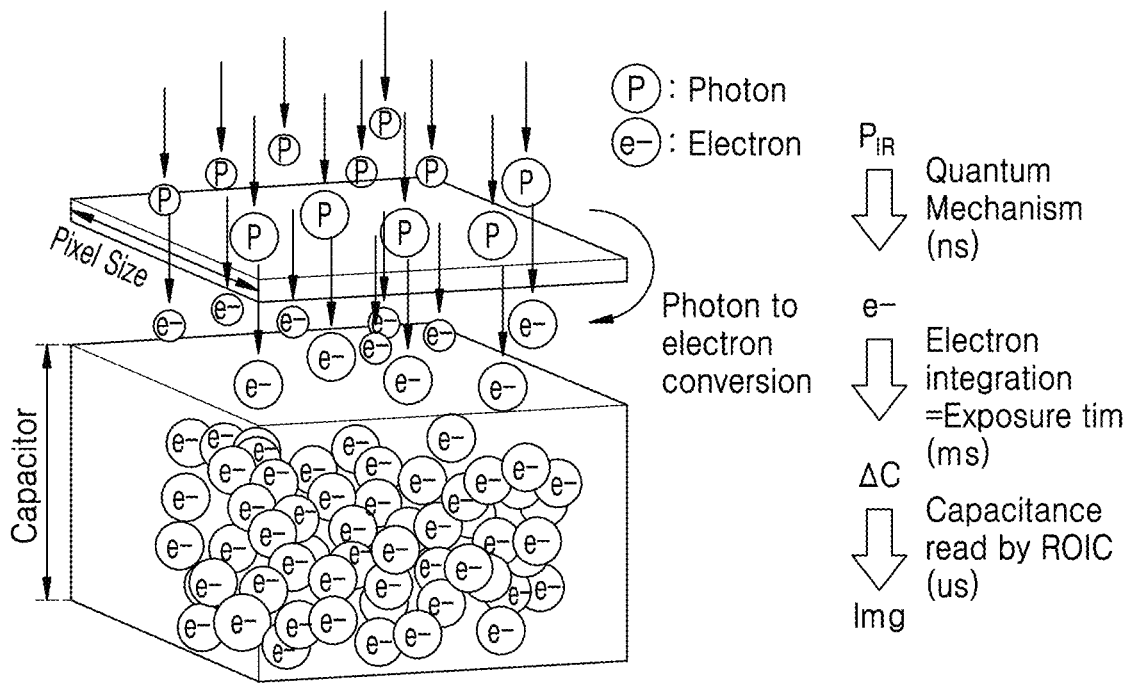
FIG. 1A is a view for describing an image generation method using a visible-light image sensor.

Reference will now be made in detail to embodiments, examples of which are illustrated in the accompanying drawings, wherein like reference numerals refer to like components throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

The disclosure may have various modifications thereto and various embodiments, and thus particular embodiments will be illustrated in the drawings and described in detail in a detailed description. Effects and features of the disclosure, and a method of achieving them will be apparent with reference to the embodiments described in detail in conjunction with the drawings. However, the disclosure is not limited to the embodiments disclosed below, but may be implemented in various forms.

Each block may indicate a part of a module, segment or code including one or more executable instructions for executing a specific logical function. In other embodiments, it should be noted that functions mentioned for each block may be executed differently from the order described. For example, even when two blocks are shown in succession, the functions described for each block may be performed substantially at the same time, or may be performed in reverse as an execution condition or an environment changes. In the following embodiments, singular forms include plural forms unless apparently indicated otherwise contextually.

In the following embodiments, the terms "include", "have", or the like, are intended to mean that there are features, or components, described herein, but do not preclude the possibility of adding one or more other features or components.

Instructions executed through a processor of a computer or other programmable data processing equipment may generate a means for performing each function described with reference to a flowchart or a block diagram. The instructions may be mounted on computers, etc., to generate processes, executed on computers, etc. for performing a series of operating steps.

In this case, the term '~ unit' used in the current embodiment may refer to a component that performs specific functions performed by hardware such as software, a field programmable gate array (FPGA), or an application special circuit (ASC). However, '~ unit' is not limited to execution by software or hardware. '~ unit' may be present in the form of data stored in an addressable storage medium, or may be configured such that one or more processors execute certain functions.

Software may include a computer program, code, instructions, or a combination of one or more thereof, and may configure a processing device to operate as desired or independently or collectively instruct the processing device. The software and/or data may be permanently or temporarily embedded in any type of machine, component, physical device, virtual equipment, computer storage medium or device, or signal wave to be transmitted, so as to be interpreted by or to provide instructions or data to the processing device. The software may be distributed over computer systems connected through a network and may be stored or executed in a distributed manner. The software and data may be stored in one or more computer-readable recording media.

FIG. 1A is a view for describing an image generation method using a visible-light image sensor.

Referring to FIG. 1A, the visible-light image sensor may generate an image by converting photons into electrons using a photon detection method.

As such, in the visible-light image sensor, photons need to be physically accumulated in the sensor. As such, the time for which a photon is accumulated in a sensor is indicated as an exposure time. When there is motion in a subject or a camera for an exposure time, a motion blur phenomenon may occur in which an image is blurred by the motion. The visible-light image sensor may be implemented with a charge-coupled device (CCD) or a complementary metal-oxide semiconductor (CMOS).

Figure 1B:
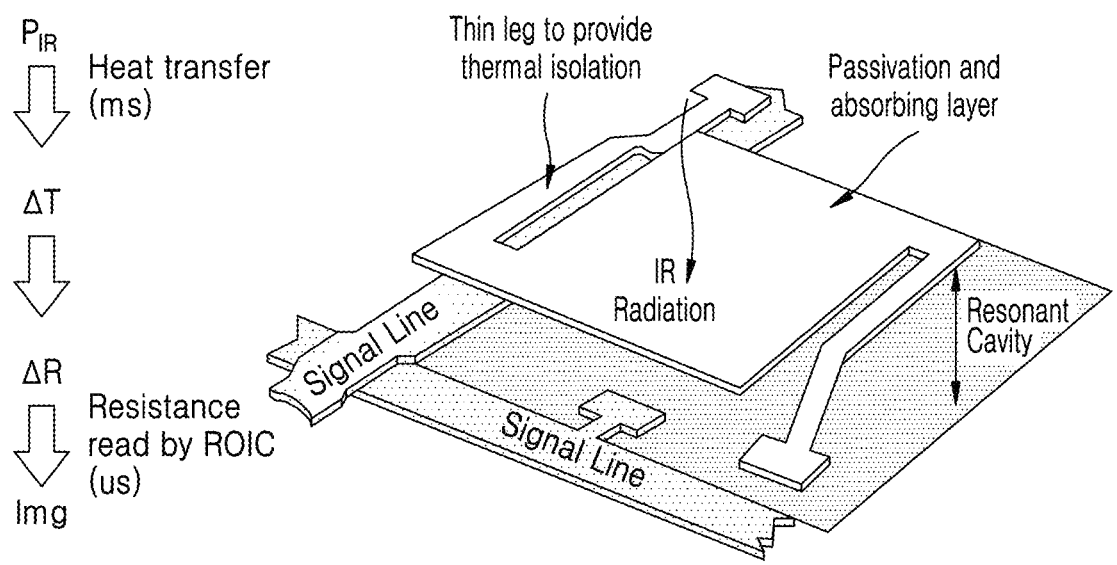
FIG. 1B is a view for describing an image generation method using an infrared (IR) sensor.

FIG. 1B is a view for describing an image generation method using an infrared (IR) sensor.

Referring to FIG. 1B, the IR sensor may be classified into two types according to a wavelength used. A cooling-type IR sensor may be used in a mid-wavelength infrared (MWIR) region, and a non-cooling-type IR sensor may be used in a long-wavelength infrared (LWIR) region. An image detection method of the non-cooling-type IR sensor may be different from that of the visible-light image sensor. For example, the non-cooling-type IR sensor may absorb photons to change a temperature of a microbolometer structure and sense the changed temperature to generate an image signal. More specifically, incident IR energy (photons) may be converted into heat energy, and a temperature change may cause a resistance change of an element. A readout integrated circuit (ROIC) may measure a resistance change of an element to obtain an image signal.

Such an IR sensor may have a motion blur phenomenon due to heat flow in the microbolometer structure. The microbolometer may be designed as a thermal isolation structure type, and a heat flow delay may occur in a structure. A heat flow delay phenomenon of the IR sensor may occur as motion blur of an image.

The motion blur phenomenon affects the image or the quality of the image, requiring a correction method through a blur kernel. Hereinbelow, a method and apparatus for generating a temperature blur kernel of an IR sensor will be described.

Figure 2:
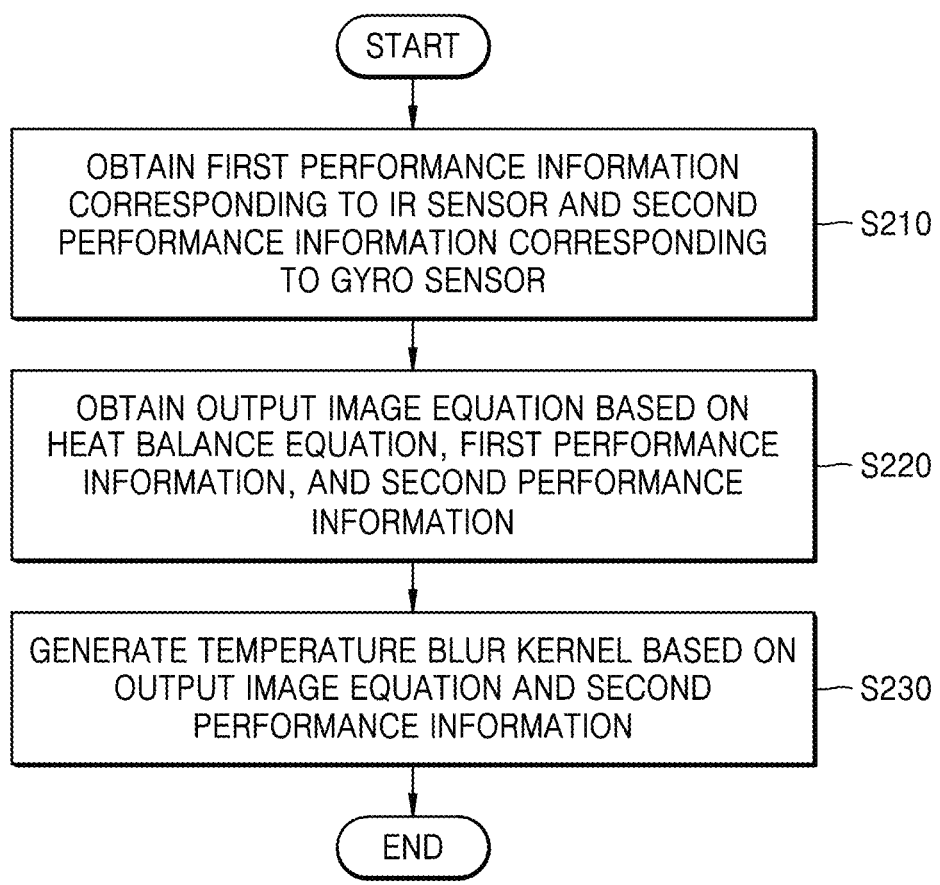
FIG. 2 is a flowchart showing an operation of a camera to generate a temperature blur kernel, according to an embodiment.

FIG. 2 is a flowchart showing an operation of a camera to generate a temperature blur kernel, according to an embodiment.

Referring to FIG. 2, a camera may obtain first performance information corresponding to an IR sensor and second performance information corresponding to a gyro sensor, in operation S210. For example, the first performance information may include a time interval between frames, a focal length, and an angle of view of one pixel, and the second performance information may include a measurable maximum angular velocity and the number of data pieces obtained for a unit time.

The camera according to an embodiment may obtain an output image equation based on the heat balance equation, the first performance information, and the second performance information, in operation S220.

The heat balance equation having a thermal isolation structure may be expressed as Equation 1.

$$C_{th}\frac{d\Delta T}{dt} + \frac{\Delta T}{R_{th}} = \eta \Phi(t) \qquad \text{[Equation 1]}$$

In Equation 1, $C_{th}$ indicates thermal capacitance (W·K), $R_{th}$ indicates thermal resistance (K·W$^{-1}$), $\Phi(t)$ indicates photon power (W), $\Delta T$ indicates device temperature difference (K), and $\eta$ indicates photon absorption rate.

A solution of a first-order differential equation of Equation 1 may be expressed as Equation 2.

$$\Delta T(t) = \frac{R_{th}\eta}{\tau}\Phi(t) * e^{\frac{-t}{\tau}}, \text{ where } \tau = C_{th}R_{th} \qquad \text{[Equation 2]}$$

$\tau$ may be a thermal time constant.

The IR sensor may measure the resistance change to obtain the image signal and may thus convert the foregoing equation into an output image equation for an output image.

The output image equation may be expressed as Equation 3 provided below.

$$B(t) = K\Phi(t) * e^{\frac{-t}{\tau}}, \text{ where } K = \frac{R_{th}\eta}{\tau} \qquad \text{[Equation 3]}$$

B(t) indicates a final output image.

The output image equation may be a continuous time model assuming a continuous situation. The IR image includes a plurality of frames and thus needs to be converted into a discrete time model. By applying a backward Euler method to the output image equation that is Equation 3, Equation 3 may be expressed as Equation 4. However, $$\frac{d\Delta T(t_k)}{dt_k} \approx \frac{\Delta T(t_k) - \Delta T(t_{k-1})}{h}.$$

$$B_{x,y}(t_k) = (1-\alpha)B_{x,y}(t_{k-1}) + \alpha S_{x,y}(t_k) \text{ where } \alpha = \frac{h}{\tau+h} \qquad \text{[Equation 4]}$$

(x, y is the position of pixel)

$B_{x,y}(t_k)$ indicates a final output image at a time $t_k$, $S_{x,y}(t_k)$ indicates a non-blurring image at a time $t_k$, $\tau$ indicates a thermal time constant, and h indicates a time interval between frames.

Equation 4 may be in the form of an infinite impulse response (IIR) filter and may thus be expressed as Equation 5 except for a recursive term.

$$B_{x,y}(t_k) = \alpha \sum_{n=1}^{k}(1-\alpha)^{k-n}S_{x,y}(t_n)(x, y \text{ is the position of pixel}) \qquad \text{[Equation 5]}$$

$$\alpha = \frac{h}{\tau+h}$$

$B_{x,y}(t_k)$ indicates a final output image at a time $t_k$, $S_{x,y}(t_n)$ indicates a non-blurring image at a time $t_n$, $\tau$ indicates a thermal time constant, and h indicates a time interval between frames.

A backward Euler method is used, and $h=t_k-t_{k-1}\approx 0$ is assumed.

In case of $t_k \approx t_{k-1}$, $\Phi(t_k) \approx \Phi(t_{k-1})$ and thus a translation between non-blurring images needs to have a time interval of one pixel or less between frames. That is, a subject in an image has to move by one pixel or less for a time interval between frames, and movement between subjects in adjacent non-blurring images has to be limited to one pixel or less to generate an exact synthetic blurring image.

Such a condition may be expressed as Equation 6.

$$h = t_k - t_{k-1} \leq \frac{IFOV}{\omega} \qquad \text{[Equation 6]}$$

h indicates a time interval between frames, IFOV indicates an angle of view of one pixel, and $\omega$ indicates a measurable maximum angular velocity. For example, for an instantaneous field of view (IFOV) of 0.1 and an angular velocity of 100 degrees/s, the time interval h has to be within about 1 ms. Herein, h of 1 ms may mean about 1000 Hz with respect to an image frame rate. That is, to generate a synthetic blurring image without distortion in the foregoing condition, a non-blurring image of about 1000 Hz may be required.

As such, the camera may obtain an output image equation and a condition satisfying the equation, based on the heat balance equation, the time interval between frames and an angle of view of one pixel, included in the first performance information corresponding to the IR sensor, and the measurable maximum angular velocity included in the second performance information corresponding to the gyro sensor, in operation S220.

The camera according to an embodiment may generate a temperature blur kernel based on the output image equation, the first performance information, and the second performance information, in operation S230.

More specifically, the camera may generate a mathematical model for homography transform with respect to angle information of the camera, based on the first performance information and the second performance information, and apply a homography transform model to the output image equation to generate a blur kernel.

A photography transform function may be expressed as Equation 7.

$$H(\theta) = KR(\theta)K^{-1} \quad \text{[Equation 7]}$$

$$K = \begin{bmatrix} f & 0 & p_{x_0} \\ 0 & f & p_{y_0} \\ 0 & 0 & 1 \end{bmatrix}$$

$$R(\theta) = \begin{bmatrix} \cos\theta_x & -\sin\theta_x & 0 \\ \sin\theta_x & \cos\theta_x & 0 \\ 0 & 0 & 1 \end{bmatrix} \cdot \begin{bmatrix} \cos\theta_y & 0 & \sin\theta_y \\ 0 & 1 & 0 \\ -\sin\theta_y & 0 & \cos\theta_y \end{bmatrix} \cdot$$

$$\begin{bmatrix} 1 & 0 & 0 \\ 0 & \cos\theta_z & -\sin\theta_z \\ 0 & \sin\theta_z & \cos\theta_z \end{bmatrix}$$

K indicates an intrinsic matrix, f indicates a focal length, ($p_{x0}$, $p_{y0}$) indicates a principal point, $R(\theta)$ indicates a rotation matrix, and ($\theta_x$, $\theta_y$, $\theta_z$) indicates a camera angle measured by the gyro sensor.

By obtaining a solution of the output image equation using Equation 7, a temperature blur kernel may be expressed as Equation 8.

$$k_t[x, y] = \frac{\alpha}{(1 - (1-\alpha)^{N_t})} \sum_{i=1}^{N_t} (1-\alpha)^{N_t - i} \delta[x - x_i, y - y_i] \quad \text{[Equation 8]}$$

$$(x_i, y_i, 1) = H(\theta(t_i))(x_0, y_0, 1), \quad \alpha = \frac{h}{\tau + h}$$

$(x, y$ is the position of pixel$)$ $k_t[x, y]$ indicates a temperature blur kernel, $N_t$ indicates the number of data pieces of the gyro sensor, obtained for a time $m\tau$, $H(\theta(t_i))$ indicates a homography transform function, $\theta(t_i)$ indicates a rotational angle in $t_i$, m indicates a user count, T indicates a thermal time constant, and h indicates a time interval between frames.

$(1-(1-\alpha)^{N_t})$ is a normalization period that allows the total sum of temperature blur kernels to be 1. A visible-light sensor may obtain an angle of a camera by using the number of gyroscope data pieces obtained for an exposure time, but an IR sensor needs to consider a thermal time constant of a microbolometer element. For example, the number of gyroscope data pieces may be sufficient to generate a blur kernel when the number of gyroscope data pieces is about 5 times the number of data pieces considering signal attenuation effects. That is, when a thermal time constant is 8 ms, the number of gyroscope data pieces, obtained for a time of 40 ms, may enable generation of the blur kernel.

The camera according to an embodiment may refine the temperature blur kernel by considering a point spread function (PSF) phenomenon of a camera optical system. Hereinbelow, a detailed description will be made with reference to FIG. 5.

As such, the camera may generate the temperature blur kernel based on the output image equation, the focal length included in the first performance information, and the number of data pieces of the gyro sensor, included in the second performance information and obtained for a unit time, in operation S230.

Figure 3:
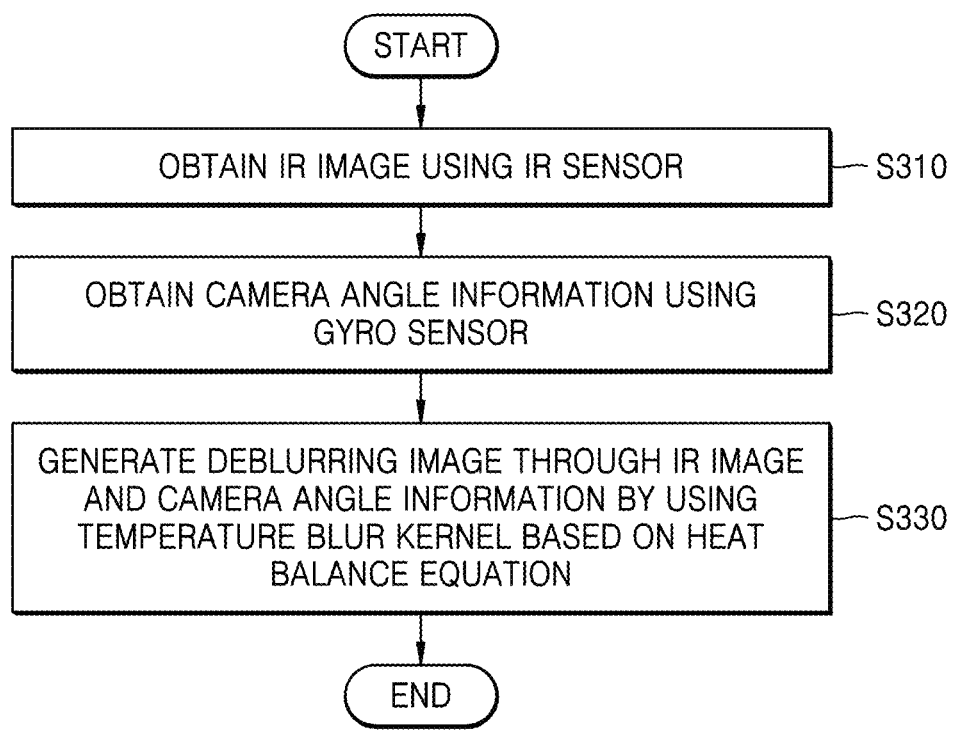
FIG. 3 is a flowchart showing an operation of a camera to generate a deblurring image, according to an embodiment.

FIG. 3 is a flowchart showing an operation of a camera to generate a deblurring image, according to an embodiment.

Referring to FIG. 3, in operation 310, the camera may obtain an IR image by using an IR sensor. The camera may obtain the IR image to satisfy a condition of the temperature blur kernel.

In operation S320, the camera according to an embodiment may obtain camera angle information by using the gyro sensor. More specifically, the camera may obtain the camera angle information by using an angular velocity measured using the gyro sensor.

In operation S330, the camera according to an embodiment may generate a deblurring image from the IR image and the camera angle information by using the temperature blur kernel based on the heat balance equation. The camera may generate the deblurring image by using a deconvolution operation between the temperature blur kernel and the IR image.

Figure 4:
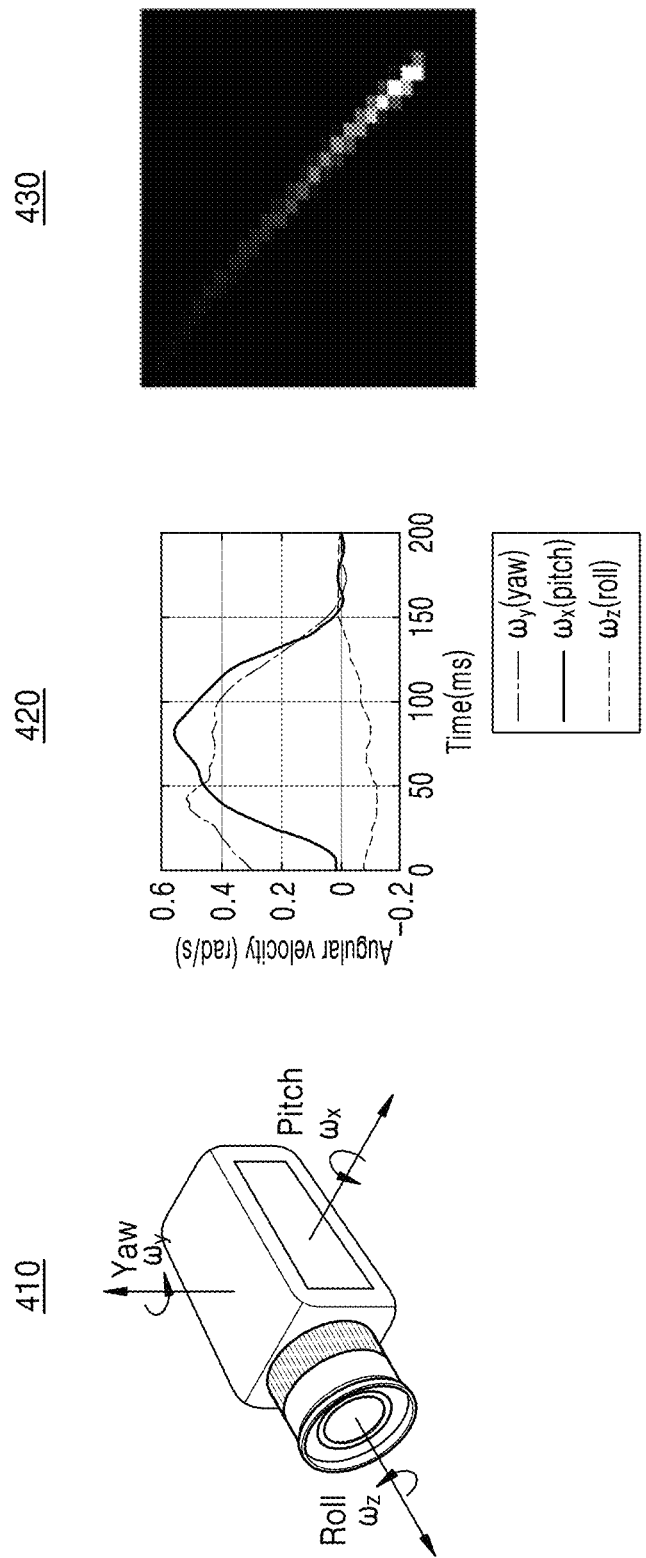
FIG. 4 is a view for describing a process of applying a temperature blur kernel, according to an embodiment.

FIG. 4 is a view for describing a process of applying a temperature blur kernel according to an embodiment.

410 of FIG. 4 schematically shows a rotational axis of the camera. For the camera, a motion blur phenomenon may occur in the image due to movement in roll, pitch, and yaw directions.

420 of FIG. 4 indicates an example of gyroscope data that measures rotational movement.

430 of FIG. 4 indicates a result of generation of the temperature blur kernel. As in Equation 8, the temperature blur kernel exponentially decays, such that the form of the blur kernel may also decay gradually. The camera may generate a blurring image through a convolution operation by using the temperature blur kernel and generate a deblurring image through a deconvolution operation.

Figure 5:
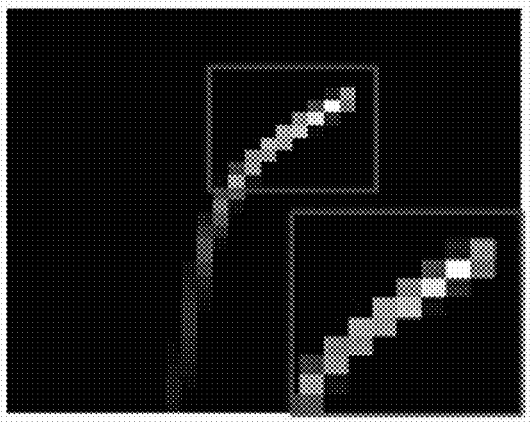
FIG. 5 is a view for describing a process of refining a temperature blur kernel, according to an embodiment.
Figure 5:
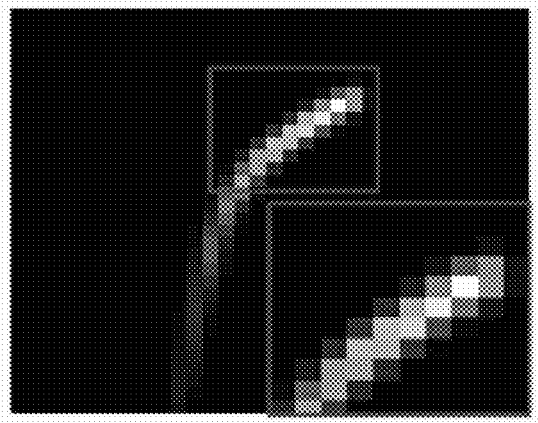

FIG. 5 is a view for describing a process of refining a temperature blur kernel, according to an embodiment.

FIG. 5 shows a kernel 510 before refinement and a kernel 520 after refinement. Even when the camera does not move, the blurring phenomenon may occur due to the PSF effect as described above. Moreover, compared to the visible-light sensor, the IR sensor may use electromagnetic waves with relatively long wavelengths, resulting in a greater diffraction effect.

Thus, the PSF based on a diffraction-limited optical system may be approximated with a Gaussian function. Distribution of the PSF may be expressed as Equation 9.

$$\sigma = 0.45 \cdot \frac{\lambda \cdot f/\#}{\beta} \quad \text{[Equation 9]}$$

$\sigma$ indicates a dispersion of a PSF Gaussian function, $\lambda$ indicates a wavelength, f/# indicates F-number, and $\beta$ indicates a weight value. For $\beta=1$, it is a diffraction-limited lens having no aberration. For example, when the camera generates a blur kernel with the kernel 510 before refinement for $\lambda=10$ μm, f/#=1.0, and $\beta=0.6$, refinement may be made like the kernel 520 after refinement.

Figure 6:
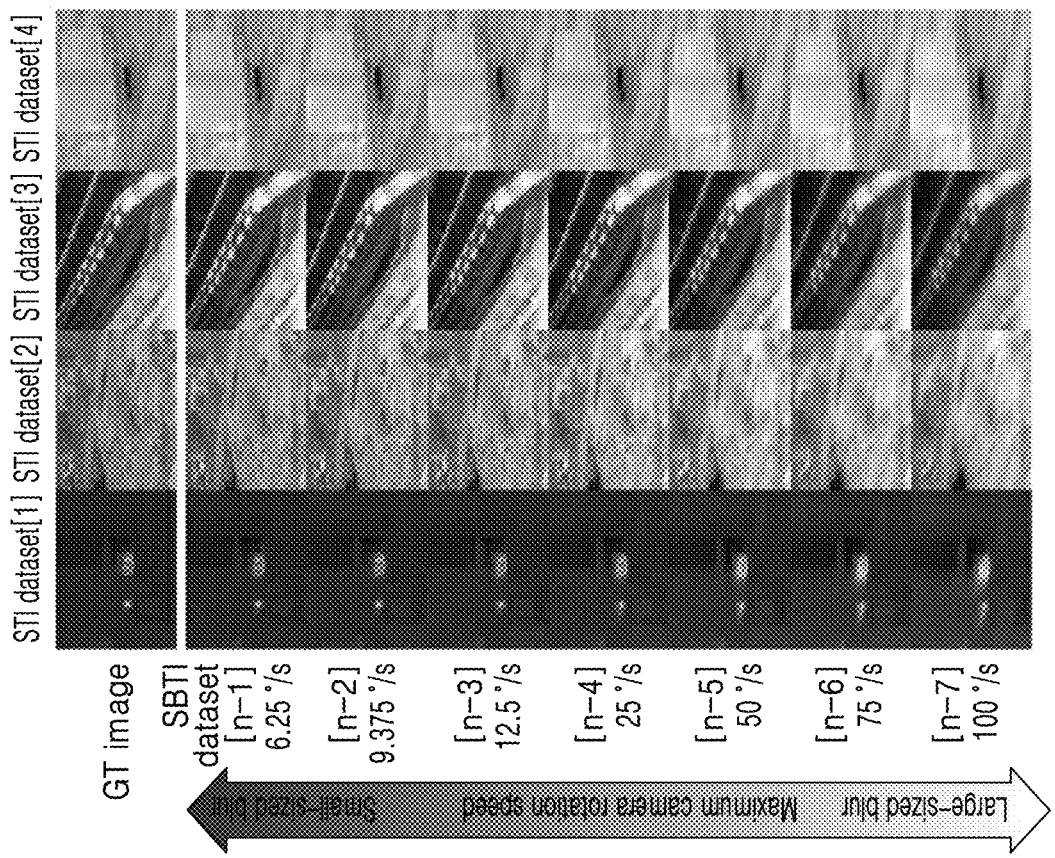
FIG. 6 shows a sample image for comparing performance of temperature blur kernels according to an embodiment.

FIG. 6 shows a sample image for comparing performance of temperature blur kernels according to an embodiment.

Referring to FIG. 6, it is shown that for four sample images of STI Dataset 1, 2, 3, and 4, a blurring image is obtained assuming that the rotation speed of the camera is 6.25%, 9.375%, 12.5%, 25%, 50%, 75%, and 100% based on the maximum angular velocity. For example, [3-6] of the table shown in FIG. 6 may indicate that a blurring image is generated assuming that the angular velocity of the camera is about 75% of the maximum angular velocity for an STI Dataset 3 sample image. Such a blurring image may be generated using the heat balance equation.

FIGS. 7A to 7D show tables for comparing performance of temperature blur kernels according to an embodiment.

More specifically, tables shown in FIGS. 7A to 7D compare a plurality of deblurring images, obtained from the plurality of blurring images generated in FIG. 6, using SRN, SIUN, DeblurGAN.v2, CDVD, and the temperature blur kernel, with the four samples images of STI Dataset 1, 2, 3, and 4 in terms of peak signal-to-noise ratio (PSNR) and structural similarity (SSIM).

FIG. 7A shows a performance comparison table of SRN, SIUN, DeblurGAN.v2, CDVD, and temperature blur kernel in [1-1] to [1-7], FIG. 7B shows a performance comparison table of SRN, SIUN, DeblurGAN.v2, CDVD, and temperature blur kernel in [2-1] to [2-7], FIG. 7C shows a performance comparison table of SRN, SIUN, DeblurGAN.v2, CDVD, and temperature blur kernel in [3-1] to [3-7], and FIG. 7D shows a performance comparison table of SRN, SIUN, DeblurGAN.v2, CDVD, and temperature blur kernel in [4-1] to [4-7].

In all of FIGS. 7A to 7D, a PSNR and an SSIM of a temperature blur kernel according to an embodiment have higher values than other kernels.

Figure 8:
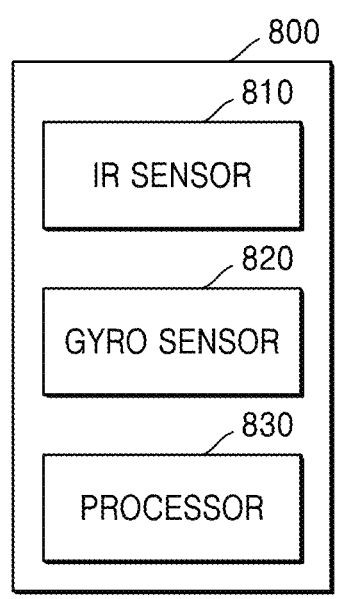
FIG. 8 is a block diagram schematically showing a structure of a camera according to an embodiment.

FIG. 8 is a block diagram schematically showing a structure 800 of a camera according to an embodiment.

Referring to FIG. 8, the camera includes an IR sensor 810, a gyro sensor 820, and a processor 830, but the disclosure is not limited thereto. For example, the IR sensor 810, the gyro sensor 820, and the processor 830 may exist independently of one another.

The IR sensor 810 may sense IR energy to convert the same into an IR image. For example, the IR sensor 810, which is a non-cooling type IR sensor, may absorb photons to change a temperature of a microbolometer structure and sense the changed temperature to generate an image signal. The IR sensor 810 may convert the incident IR photon into heat energy, and a temperature change may cause a resistance change, such that an ROIC may obtain an image signal by measuring the resistance change of the element.

The gyro sensor 820 may measure angle information of an IR camera. More specifically, the gyro sensor 820 may measure an angular velocity of the IR camera and measure the angle information of the camera by using the angular velocity.

The processor 830 may be a component for controlling the camera as a whole. For example, the processor 830 may control the camera to perform the operations of FIGS. 2 and 3.

The processor 830 according to an embodiment may obtain the first performance information corresponding to the IR sensor and the second performance information corresponding to the gyro sensor, obtain the output image equation based on the heat balance equation, the first performance information, and the second performance information, and generate the temperature blur kernel based on the first performance information and the second performance information.

The processor 830 according to an embodiment may generate a deblurring image from the IR image and the camera angle information by using the temperature blur kernel based on the heat balance equation.

More specifically, the processor 830 may include a central processing unit (CPU), random-access memory (RAM), read-only memory (ROM), a system bus, etc. The processor 830 may be implemented with a single CPU or a plurality of CPUs (or digital signal processors (DSPs) or system on chips (SoCs)). In one embodiment, the processor 830 may be implemented with a DSP, a microprocessor, or a time controller (TCON) to process a digital signal. However, the disclosure is not limited thereto, and the processor 830 may also include or may be defined as one or more of a CPU, a micro controller unit (MCU), a micro processing unit (MPU), a controller, an application processor (AP), a communication processor (CP), and an ARM processor. The processor 830 may be implemented with an SoC having a processing algorithm embedded therein, large scale integration (LSI), or an FPGA.

While embodiments have been described by the limited embodiments and drawings, various modifications and changes may be made from the disclosure by those of ordinary skill in the art. For example, even when described techniques are performed in a sequence different from the described method and/or components such as systems, structures, devices, circuits, etc. are combined or connected differently from the described method, or replaced with other components or equivalents, an appropriate result may be achieved.

Therefore, other implementations, other embodiments, and equivalents to the claims may also fall within the scope of the claims provided below.

A method and apparatus for generating a temperature kernel based on a heat balance equation according to an embodiment is provided.

A method and apparatus for deblurring an image using a temperature kernel based on a heat balance equation according to an embodiment is provided.

The effects of the disclosure are not limited to the effects mentioned above.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method implemented by a computer device for generating a temperature blur kernel, the method comprising:
    obtaining first performance information corresponding to an infrared (IR) sensor and second performance information corresponding to a gyro sensor;
    converting a heat balance equation into an output image equation based on the first performance information, and the second performance information; and
    generating a temperature blur kernel based on the output image equation, the first performance information, and the second performance information,
    wherein the first performance information comprises a time interval between frames that sets a subject displacement within a unit pixel.

2. The method of claim 1, wherein the first performance information comprises a focal length, and an angle of view of one pixel, and
    the second performance information comprises a measurable maximum angular velocity and a number of data pieces obtained for a unit time.

3. The method of claim 1, wherein the output image equation is Equation 1 provided below:

$$B_{x,y}(t_k) = \alpha \sum_{n=1}^{k}(1-\alpha)^{k-n} S_{x,y}(t_n) \quad (x, y \text{ is the position of pixel}) \quad \text{[Equation 1]}$$

$$\alpha = \frac{h}{\tau + h}$$

wherein $B_{x,y}(t_k)$ indicates a final output image at a time $t_k$, $S_{x,y}(t_n)$ indicates a non-blurring image at a time $t_n$, $\tau$ indicates a thermal time constant, and h indicates the time interval between frames.

4. The method of claim 3, wherein the time interval between the frames satisfies Equation 2:

$$h \leq \frac{IFOV}{\omega} \quad \text{[Equation 2]}$$

wherein h indicates the time interval between frames, IFOV indicates an angle of view of one pixel, and $\omega$ indicates a measurable maximum angular velocity.

5. The method of claim 1, wherein the temperature blur kernel is calculated by Equation 3:

$$k_t[x, y] = \frac{\alpha}{\left(1-(1-\alpha)^{N_t}\right)} \sum_{i=1}^{N_t}(1-\alpha)^{N_t-i} \delta[x-x_i, y-y_i] \quad \text{[Equation 3]}$$

$$(x_i, y_i, 1) = H(\theta(t_i))(x_0, y_0, 1), \alpha = \frac{h}{\tau + h}$$

$(x, y$ is the position of pixel)

wherein $k_t[x, y]$ indicates a temperature blur kernel, $N_t$ indicates a number of data pieces of the gyro sensor, obtained for a time $m\tau$, $H(\theta(t_i))$ indicates a homography transform function, $\theta(t_i)$ indicates a rotational angle in $t_i$, m indicates a user count, $\tau$ indicates a thermal time constant, and h indicates the time interval between frames.

6. A method of correcting an image from an infrared (IR) camera, the method comprising:
obtaining an IR image by using an IR sensor;
obtaining angle information of the IR camera by using a gyro sensor; and
generating a deblurring image through the IR image and the angle information of the IR camera using a temperature blur kernel based on a heat balance equation,
wherein the temperature blur kernel is generated by a computer device through:
obtaining first performance information corresponding to the IR sensor and second performance information corresponding to the gyro sensor;
converting a heat balance equation into an output image equation based on the first performance information, and the second performance information; and
generating the temperature blur kernel based on the output image equation, the first performance information, and the second performance information,
wherein the first performance information comprises a time interval between frames that sets a subject displacement within a unit pixel.

7. An infrared (IR) camera comprising:
an IR sensor configured to sense IR energy and convert the IR energy into an IR image;
a gyro sensor configured to measure angle information of the IR camera; and
a processor configured to generate a deblurring image through the IR image and the angle information of the IR camera by using a temperature blur kernel based on a heat balance equation,
wherein the temperature blur kernel is generated by a computer device through:
obtaining first performance information corresponding to the IR sensor and second performance information corresponding to the gyro sensor;
converting a heat balance equation into an output image equation based on the first performance information, and the second performance information; and
generating the temperature blur kernel based on the output image equation, the first performance information, and the second performance information,
wherein the first performance information comprises a time interval between frames that sets a subject displacement within a unit pixel.

* * * * *